A. W. TODD.
Insect-Destroyer.
No. 43,723.
Patented Aug. 2, 1864.
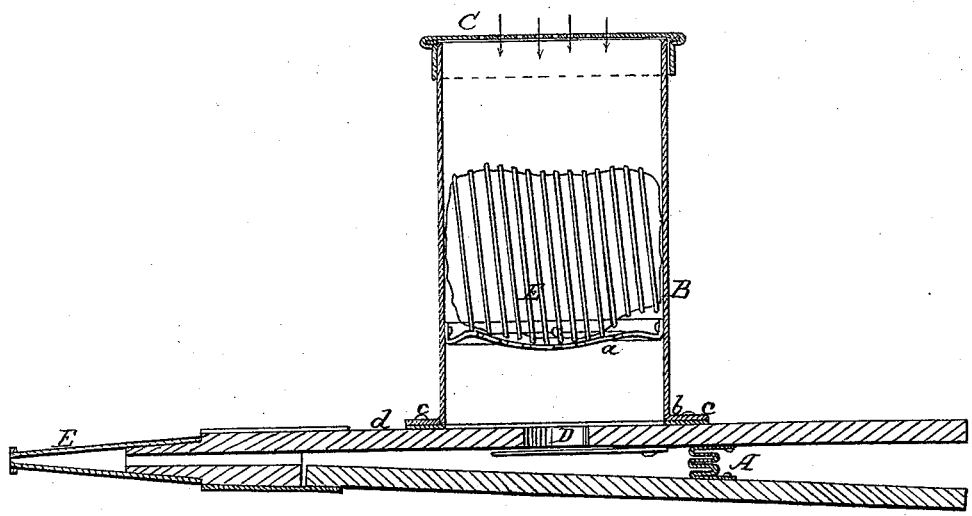
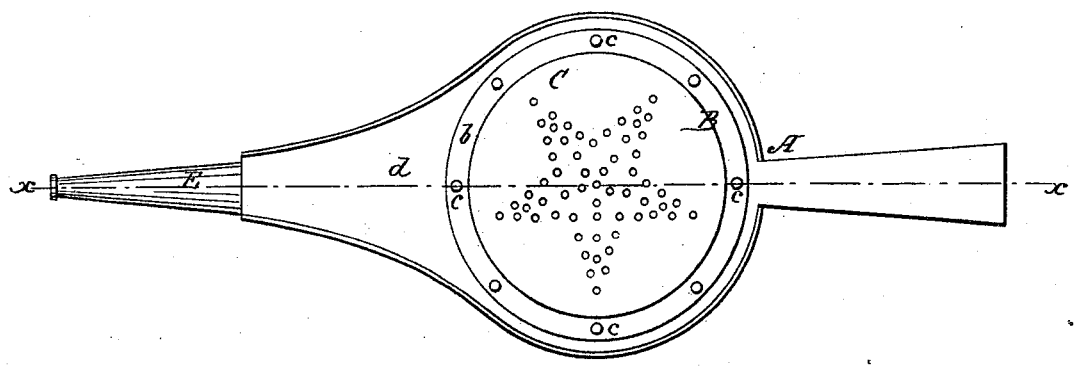
Witnesses:
Henry Morris.
Geo. W. Reed.
Inventor:
A. W. Todd
per Munn & Co.
attorneys.

UNITED STATES PATENT OFFICE.

A. W. TODD, OF CHICAGO, ILLINOIS.

IMPROVED FUMIGATOR.

Specification forming part of Letters Patent No. 43,723, dated August 2, 1864.

*To all whom it may concern:*

Be it known that I, A. W. TODD, of Chicago, in the county of Cook and State of Illinois, have invented a new and improved fumigator for quieting or pacifying bees in order to extract the honey from the hives, and also for other purposes; and I do hereby declare that the following is a full, clear, and exact description thereof, which will enable others skilled in the art to make and use the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate like parts.

This invention consists in attaching to an ordinary bellows a box containing the burning material, said box being attached to the bellows so as to cover the valve thereof and cause all the air that enters the bellows to pass through the box so as to insure the burning of the material therein, and cause the smoke to enter the bellows and be expelled from the nozzle thereof, as hereinafter fully set forth.

A represents a pair of bellows, which may be constructed in the usual way, and therefore does not require a special description.

B represents a box, which may be of cylindrical or other form, constructed of sheet metal, and having within it a perforated partition, $a$, and provided with a perforated lid or cover, C. The lower end of the box B is provided with a flange, $b$, through which screws or nails $c$ pass into the top board, $d$, of the bellows to secure the box thereto, and directly over the valve D, as shown clearly in Fig. 1.

The box B may be of any suitable dimensions, and within it there is placed a wad, E, of cotton, cotton rags, or other material, which may be bound with wire in order to render it compact and prevent it, when lighted, from burning rapidly, the object being to have it smolder and smoke.

From the above description it will be seen that when the bellows is distended the valve D opens inward, and the air rushes down through the perforations in the lid or cover C of the box, and through the latter, causing the smoke in the box to enter the bellows, from whence it is ejected through the nozzle F when the bellows is contracted. The wad E rests upon the perforated partition $a$, the latter keeping the wad from the valve D, so that the latter cannot become choked or clogged or its free action interfered with in any way. By this simple device smoke may be ejected into a hive and the bees quieted without any trouble or difficulty whatever.

Having thus described my invention, what I claim as new, and desire to secure by Letters Patent, is—

The arrangement and combination of the parts, consisting of the bellows A, with the smudge chamber B over its valve, with a perforated partition, $a$, to sustain the smoking material, and a perforated lid, C, to admit air, as described and represented.

A. W. TODD.

Witnesses:
   J. STANFORD,
   B. WOOD.